United States Patent
Fukuda

(10) Patent No.: US 6,725,962 B1
(45) Date of Patent: Apr. 27, 2004

(54) TRANSMISSION LOCK FOR ALL-TERRAIN VEHICLE

(75) Inventor: Kazutaka Fukuda, Iwata (JP)

(73) Assignee: Yamaha Hatsudoki Kabushiki Kaisha, Shizuoka-ken (JP)

(*) Notice: Subject to any disclaimer, the term of this patent is extended or adjusted under 35 U.S.C. 154(b) by 0 days.

(21) Appl. No.: 09/295,034

(22) Filed: Apr. 20, 1999

(30) Foreign Application Priority Data

Apr. 20, 1998 (JP) .......................................... 10-109313

(51) Int. Cl.⁷ ............................................... B60K 5/00
(52) U.S. Cl. ..................... 180/292; 192/219.5; 180/337
(58) Field of Search ................. 192/219.5; 180/291, 180/292, 337

(56) References Cited

U.S. PATENT DOCUMENTS

| | | |
|---|---|---|
| 1,210,754 A | 1/1917 | Beatty |
| 4,089,394 A * | 5/1978 | Haupt et al. ............. 192/219.5 |
| 4,509,624 A * | 4/1985 | Barr ........................ 192/219.5 |
| 4,520,890 A | 6/1985 | Marier |
| 4,561,518 A | 12/1985 | Grinde |
| 4,602,696 A | 7/1986 | Taga et al. |
| 4,606,429 A | 8/1986 | Kurata |
| 4,610,336 A * | 9/1986 | Kuwayama et al. ..... 192/219.5 |
| 4,614,256 A * | 9/1986 | Kuwayama et al. ..... 192/219.5 |
| 4,645,046 A * | 2/1987 | Takano et al. ........... 192/219.5 |
| 4,666,015 A | 5/1987 | Matsuda et al. |
| 4,667,760 A | 5/1987 | Takimoto |
| 4,699,234 A | 10/1987 | Shinozaki et al. |
| 4,704,920 A | 11/1987 | Kurata |
| 4,714,126 A | 12/1987 | Shinozaki et al. |
| 4,719,984 A | 1/1988 | Watanabe |
| 4,723,624 A | 2/1988 | Kawasaki et al. |
| 4,727,967 A * | 3/1988 | Ogasawara et al. ..... 192/219.5 |
| 4,876,991 A | 10/1989 | Galitello, Jr. |
| 4,974,693 A | 12/1990 | Nakai et al. |
| 5,005,662 A | 4/1991 | Kodama |
| 5,044,458 A | 9/1991 | Schwarz et al. |
| 5,067,933 A * | 11/1991 | Hardesty et al. ............... 475/32 |
| 5,170,869 A * | 12/1992 | Svab et al. ............... 192/219.5 |
| 5,305,848 A | 4/1994 | Akutagawa et al. |
| 5,323,870 A | 6/1994 | Parigger et al. |
| 5,332,060 A | 7/1994 | Sperduti et al. |
| 5,335,641 A | 8/1994 | Schnabel |
| 5,389,047 A * | 2/1995 | Akiyama ..................... 475/200 |
| 5,505,278 A | 4/1996 | Smith |
| 5,531,303 A * | 7/1996 | Raskowski ............... 192/219.5 |
| 5,649,457 A * | 7/1997 | Kudou et al. ............. 74/606 R |
| 5,715,901 A * | 2/1998 | Tokushima ................. 180/65.6 |
| 5,740,878 A | 4/1998 | Sala |

(List continued on next page.)

OTHER PUBLICATIONS

Bombardier Traxter 500 4X4, *Dirt Wheels*, Jan., 1999.
Manufacturers Press Release for the Bombardier ATV Traxter. Printed from website www.off–road.com.
Davis, B. "Bombardier Traxter: The Art of Innovation"Sep. 20, 1998. Printed from website www.ATVConnection.com.
Parts catalog for 1999 Traxter ATVs. Jun., 1999.

*Primary Examiner*—Lesley D. Morris
*Assistant Examiner*—L. Lum
(74) *Attorney, Agent, or Firm*—Knobbe, Martens, Olson & Bear, LLP

(57) ABSTRACT

All all-terrain vehicle has a shiftable transmission that is coupled to a variable speed V-belt transmission. The variable speed V-belt transmission is joined to a crankshaft through a centrifugal clutching arrangement. The shiftable transmission enables an operator to go between low, high, neutral, reverse, and park. In the park position, the transmission is locked from substantial rotation such that the engaged wheels of the all-terrain vehicle are also locked from substantial rotation, whether or not the engine speed is sufficient to allow the centrifugal clutch to be engaged with the variable speed transmission.

23 Claims, 7 Drawing Sheets

U.S. PATENT DOCUMENTS

| | | | |
|---|---|---|---|
| 5,890,988 A | * 4/1999 | Kasuya et al. | 475/282 |
| 5,935,436 A | * 8/1999 | Razkowski et al. | 192/219.5 |
| 5,951,433 A | * 9/1999 | Tsukamoto et al. | 475/281 |
| 5,964,680 A | * 10/1999 | Salecker et al. | 477/74 |
| 6,029,638 A | 2/2000 | Funai et al. | |
| 6,065,581 A | * 5/2000 | Nogle | 192/219.5 |
| 6,076,624 A | * 6/2000 | Izumi et al. | 180/291 |
| 6,155,371 A | * 12/2000 | Izumi | 180/292 |
| 6,164,427 A | * 12/2000 | Ogawa | 192/219.5 |
| 6,170,597 B1 | * 1/2001 | Fukuda | 180/292 |
| 6,182,784 B1 | * 2/2001 | Pestotnik | 180/376 |
| 6,186,263 B1 | * 2/2001 | Takano | 180/336 |
| 6,250,415 B1 | * 6/2001 | Seto | 180/337 |
| 6,269,899 B1 | * 7/2001 | Izumi | 180/233 |
| 6,296,073 B1 | * 10/2001 | Rioux et al. | 180/292 |

* cited by examiner

TRANSMISSION LOCK FOR ALL-TERRAIN VEHICLE

BACKGROUND OF THE INVENTION

1. Field of the Invention

The present invention generally relates to a transmission lock for an all-terrain vehicle. More particularly, the present invention relates to a transmission lock for use in an engine having a centrifugal clutch.

2. Related Art

All terrain vehicles are powered by internal combustion engines through appropriate drive trains connected to at least one of the wheels. In some such vehicles, the drive train may include a v-belt variable speed transmission that is coupled to a shiftable gear box. The output from the gear box of such drive trains provides rotational power to drive shafts that power the front and/or rear wheels of the vehicle. The gear box in some vehicles enables an operator to select between a high gear and a low gear while the vehicle is at rest. In such shiftable transmissions, the high gear may be used for general riding and high speed operation while the low gear may be used for towing or other high power operations.

Such all terrain vehicles may also include a parking brake. The parking brake generally is structured to utilize the calipers of the disk brake system to clamp and hold a set of brake pads in contact with the brake disk to prevent movement of the wheels. Thus, the brake pads are applied to the disk and locked in the applied position to reduce the likelihood of the vehicle rolling while the engine is disengaged or stopped. When motion is resumed, an operator may forget to disengage the parking brake and may operate the vehicle with the brake pads engaged with the brake disk. Such dragging of the pads on the disk may result in damage, such as glazing of the pads or scoring or warping of the brake disk.

SUMMARY OF THE INVENTION

Accordingly, one feature of the present invention is a locking transmission that enables an operator to apply a parking brake without utilizing the conventional braking system of the all terrain vehicle. Another feature of the present invention utilizes a shiftable transmission to engage the drive shafts, and ultimately, the wheels to result in a parking brake that stops wheel motion through disabling drive shaft motion.

One aspect of the present invention, therefore, involves an all terrain vehicle comprising a frame, at least one front wheel and at least one rear wheel connected to the frame and an engine mounted to the frame. The engine powers a crankshaft. A centrifugal clutch connects the crankshaft to a variable speed transmission. A shiftable transmission is connected to the variable speed transmission and at least one drive line extending to at least one of the front wheel or the rear wheel. The shiftable transmission comprises a locking portion capable of locking the transmission from rotation when the locking portion is engaged.

Another aspect of the present invention involves an all terrain vehicle comprising a frame, a seat attached to the frame, and at least one front wheel and one rear wheel connected to the frame. An engine is mounted to the frame generally between the front wheel and the rear wheel with a transmission connected to the engine and connected to at least one of the front wheel and rear wheel. The transmission comprising a variable speed transmission and a shiftable geared transmission contained at least partially within a housing. A parking brake arranged within the housing.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which drawings.

DETAILED DESCRIPTION OF THE PREFERRED EMBODIMENT OF THE PRESENT INVENTION

Figure 1:
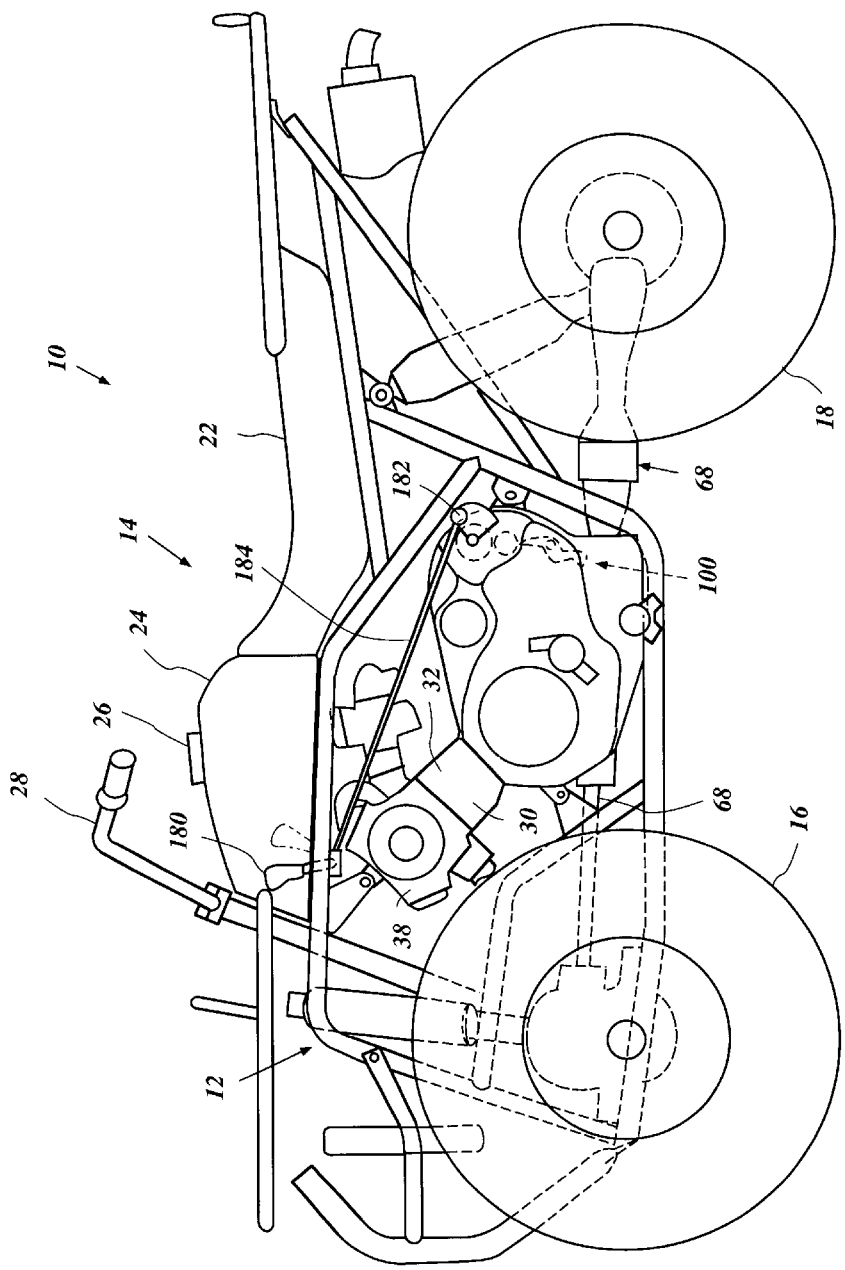
FIG. 1 is a side view of an all-terrain vehicle having a transmission lock arranged and configured in accordance with certain features, aspects, and advantages of the present invention having certain internal components illustrated with hidden lines.

With reference initially to FIG. 1, an all-terrain vehicle configured and arranged in accordance with certain features, aspects, and advantages of the present invention will be described in detail. The illustrated vehicle, indicated generally by reference numeral 10, provides an exemplary environment in which the present transmission locking arrangement will be described. While the vehicle 10 is a small stature, four-wheel, all-terrain vehicle, one of ordinary skill in the art will readily recognize that the present transmission locking arrangement may find utility in a variety of other land-based vehicles as well.

With continued reference to FIG. 1, the vehicle 10 is generally comprised of a frame 12, a body 14, a pair of front wheels 16, and a pair of rear wheels 18 assembled in any suitable manner. The frame 12 is typically of a welded construction and generally defines, in part, a centrally located engine compartment. A foot peg 20 or other food board structure may be attached to both sides of the frame in any suitable manner such that an operator may position a foot on each side of the vehicle on the foot peg 20 or any other suitable foot board structure.

The illustrated frame 12 carries several components that together form the body 14. For instance, a seat 22 is carried atop a portion of the frame 12 in a rearward position. In the illustrated embodiment, the seat 22 generally comprises an elongated, longitudinally extending straddle-type seat. Thus, an operator may sit upon the seat and place a leg on either side of the body of the vehicle 10 during operation. Additionally, where more than one rider is contemplated, the riders may be positioned in a tandem style such that one is positioned in front of the other and both have a leg hanging on either side of the straddle-type seat 22.

As illustrated, fuel tank 24 is also mounted to the frame 12 at a position forward of the seat 22. The fuel tank can be of any suitable construction and desirably includes a fuel gauge and cap arrangement 26.

A steering handle assembly 28 extends through the illustrated frame, preferably at a position forward of the fuel tank 24, and terminates at a location desirably above an upper surface of the fuel tank 24. As is known, the steering handle assembly 28 may be connected to the front wheels 16 in any suitable manner such that the vehicle 10 may be steered by turning the handle 28 about a pivot axis (not shown). Desirably, the steering handle 28 also carries a throttle operator such as a twist grip or thumb paddle.

As each of the above-described components and the methods related to their manufacture and assembly are considered to be well known for those of ordinary skill in the art, further description of such components and/or their assembly is deemed unnecessary.

With continued reference to FIG. 1, an engine 30 is desirably positioned within the engine compartment defined by the frame 12 and attached thereto in any suitable manner. In the illustrated embodiment, the engine 30 comprises a onecylinder, two-cycle construction. It should be noted, however, that the engine 30 could also have two or more cylinders that could operate on any known operating principle, such as a four-cycle principle.

Figure 3:
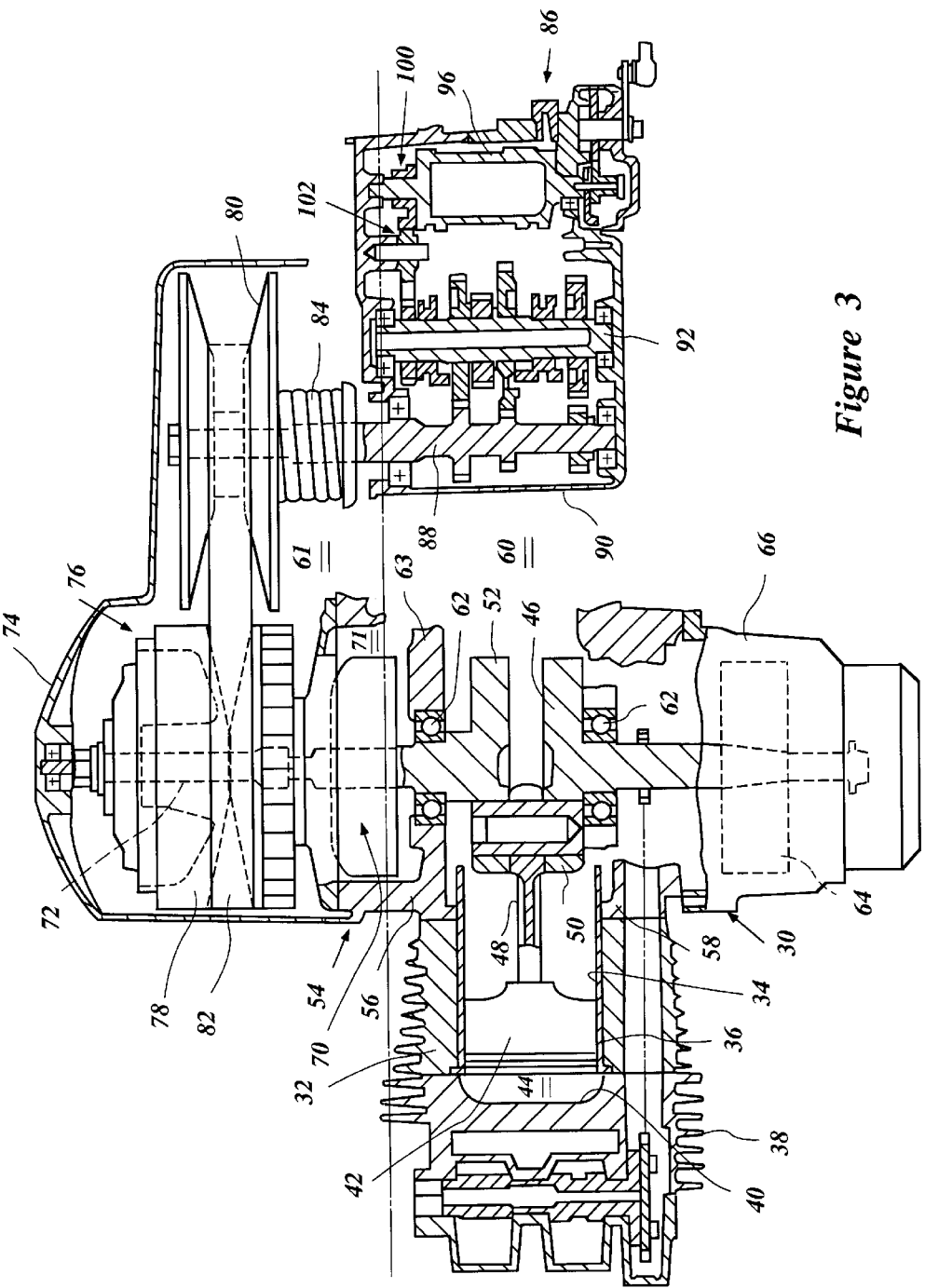
FIG. 3 is a partially sectioned top view of an engine for use in all terrain vehicles such as that illustrated in FIG. 1 showing an engine output, variable speed belt drive, and transmission lock arrangement.

With reference now to FIG. 3, the engine 30 generally comprises a cylinder block 32. The cylinder block 32 preferably contains at least one cylinder bore 34 that may be inclined along an axis that is skewed relative to a vertically-extending axis. Such a cylinder block configuration enables a reduced vertical dimension to the overall engine envelope and, therefore, creates a more compact engine arrangement and a reduced vehicle size and weight. Notably, the cylinder bore 34 may also be provided with a sleeve 36 to increase engine efficiency and durability.

With continued reference to FIG. 3, a cylinder head assembly 38 may be attached to the cylinder block 32, covering an end of the cylinder bore 34. The cylinder head assembly 38 preferably features a recess 40 that cooperates with the cylinder bore 34 and a top surface of a piston 42 to define a combustion chamber 44 within the cylinder. The cylinder head assembly 38 may be attached to the illustrated cylinder block 32 using a set of threaded fasteners (not shown) or may be attached in any other suitable manner.

With continued reference to FIG. 3, the piston 42 reciprocates within the cylinder bore 34, or within the sleeve 36 if provided, and is connected to a crankshaft 46 via a connecting rod 48. A connecting rod 48 is connected to the crankshaft at a throw 50 of the crankshaft 46. In this configuration, as the piston 42 completes a full translating cycle, the crankshaft 46 may complete a full revolution. A counterweight portion 52 of the crankshaft 46 roughly extends from the opposing side of the crankshaft 46 relative to the throw 50. The linkage between the piston 42 and the crankshaft 46 therefore transposes the pistons reciprocal translating motion into a rotational output while a counterweight portion helps to balance the rotation of the crankshaft 46.

The crankshaft 46, as illustrated in FIG. 3, may be substantially restrained for rotational movement within a crankcase 54. In the illustrated embodiment, the crankcase 54 is divided into a first portion 56 and a second portion 58. The dividing line between the first portion 56 and the second portion 58 of the illustrated crankcase 54 is desirably approximately positioned to extend through the connecting rod location. Of course, other dividing locations may also be envisioned. As such, the crankcase 54 through its two components, 56, 58, generally defines among other chambers a crank chamber 60.

In the illustrated embodiment, a set of bearings 62 desirably journal the crankshaft 46 for rotation within the crank chamber 60. The bearings 62 may be set within a substantially vertically extending wall 63 which, in part, defines a single cell of the crank chamber 60 that corresponds to the single cylinder. In multiple-cylinder embodiments, a plurality of such walls may segregate the crank chamber 60 into several cells such that one cell would correspond to one cylinder. This is standard practice in two cycle applications; however, in the illustrated embodiment, the wall 63 generally divides the crankcase 54 into a crank chamber 60 and an auxiliary chamber 61 as well.

A flywheel magneto 64 may be connected to one end of the illustrated crankshaft 46. As is known, the flywheel magneto 64 rotates with the crankshaft 46 and may be used to sense the engine speed. Additionally, the flywheel magneto 64 may function as an electrical generator in some embodiments. As illustrated in FIG. 3, the flywheel 64 may be contained, in part, within a flywheel cover 66 that is attached to the second portion 58 of the crankcase 54 in any suitable manner. As the flywheel magneto 64 is relatively unimportant to the present transmission locking arrangement, further description of the flywheel magneto 64 is deemed unnecessary.

With reference again to FIG. 1, the rotational power of the illustrated crankshaft 46 is transferred to either the front wheels, the rear wheels, or both through a suitable drive line 68. In the illustrated embodiment, the drive line 68 is preferably a pair of drive shafts arranged and configured such that the rear drive shaft is dedicated to driving the vehicle while the front drive shaft is selectively engageable with the rotational output of the crankshaft through any suitable, shiftable transmission. As will be recognized by those of ordinary skill in the art, the drive line 68 may also comprise chain drives, gear drives, or any other suitable drive arrangement.

As illustrated in FIG. 1, the drive line 68 of the illustrated embodiment extends in a substantially longitudinal direction, which is normal to the substantially lateral extension of the crankshaft 46. Accordingly, a transfer gear arrangement, discussed below, is provided within a gear box formed within the illustrated auxiliary chamber 61 to transfer the power from the laterally extending crankshaft 46 to the longitudinally extending drive line 68.

With reference again to FIG. 3, a centrifugal clutch 70 connects the illustrated drive shaft 46 and a transmission input shaft 72. The centrifugal clutch 70, as is well known, automatically disengages the input shaft 72 from the crankshaft 46 when the engine speed falls below a predetermined speed and reengages the two shafts 46, 72 when the engine speed exceeds the predetermined speed. The clutch 70 is desirably housed within a clutching chamber 71 that is interposed between the crank chamber 60 and the auxiliary chamber 61. The input shaft 72, as illustrated in FIG. 3, extends through a wall of the clutching chamber and is preferably journaled for rotation by a set of bearings, including the bearings that are carried in a wall formed within a transmission cover 74.

The input shaft 72 is coupled to a variable speed transmission 76. The variable speed transmission 76 generally comprises a drive V-belt pulley 78 that is joined to the input shaft 72 via splines or the like such that the drive pulley 78 is coupled for rotation with the input shaft 72. As is known, the drive pulley is designed to expand or contract due to increases and decreases in engine speed, thereby altering in effective diameter of the pulley as the engine speed or the input shaft speed changes. A driven pulley 80 is coupled to the drive pulley 78 with a drive belt 82. The driven pulley 80 may also be configured to change in effective diameter in accordance with changes in the drive pulley diameter. For instance, in the illustrated embodiment, the sheaves forming the driven pulley 80 are forced together by a biasing member such as, for example, a spring 84. In this manner, the driven pulley size can vary in relation to the changes in the drive pulley size.

With continued reference initially to FIG. 3, the driven pulley 80 is connected to a shiftable transmission arrangement 86 through an input shaft 88. As discussed above, the shiftable transmission 86 is desirably contained within a gear box 90 such that it is segregated from the crank chamber and the auxiliary chamber. Generally, the shiftable transmission 86 is comprised of the input shaft 88 that is drivingly connected to a main shaft 92. The main shaft 92 is drivingly engaged with an output shaft 94 illustrated best in FIG. 6. In the illustrated embodiment, the output shaft 94 is positioned directly below the main shaft 92. However, other configurations are also possible.

The shiftable transmission 86 also comprises a cam drum 96 that is in cooperation with a set of shifting forks 98 and a parking brake unit 100, as will be described in detail below. Generally, the parking brake unit 100 includes an operational element 102 that may be selectively engaged with the main shaft 92 to prevent substantial rotation thereof.

Figure 4:
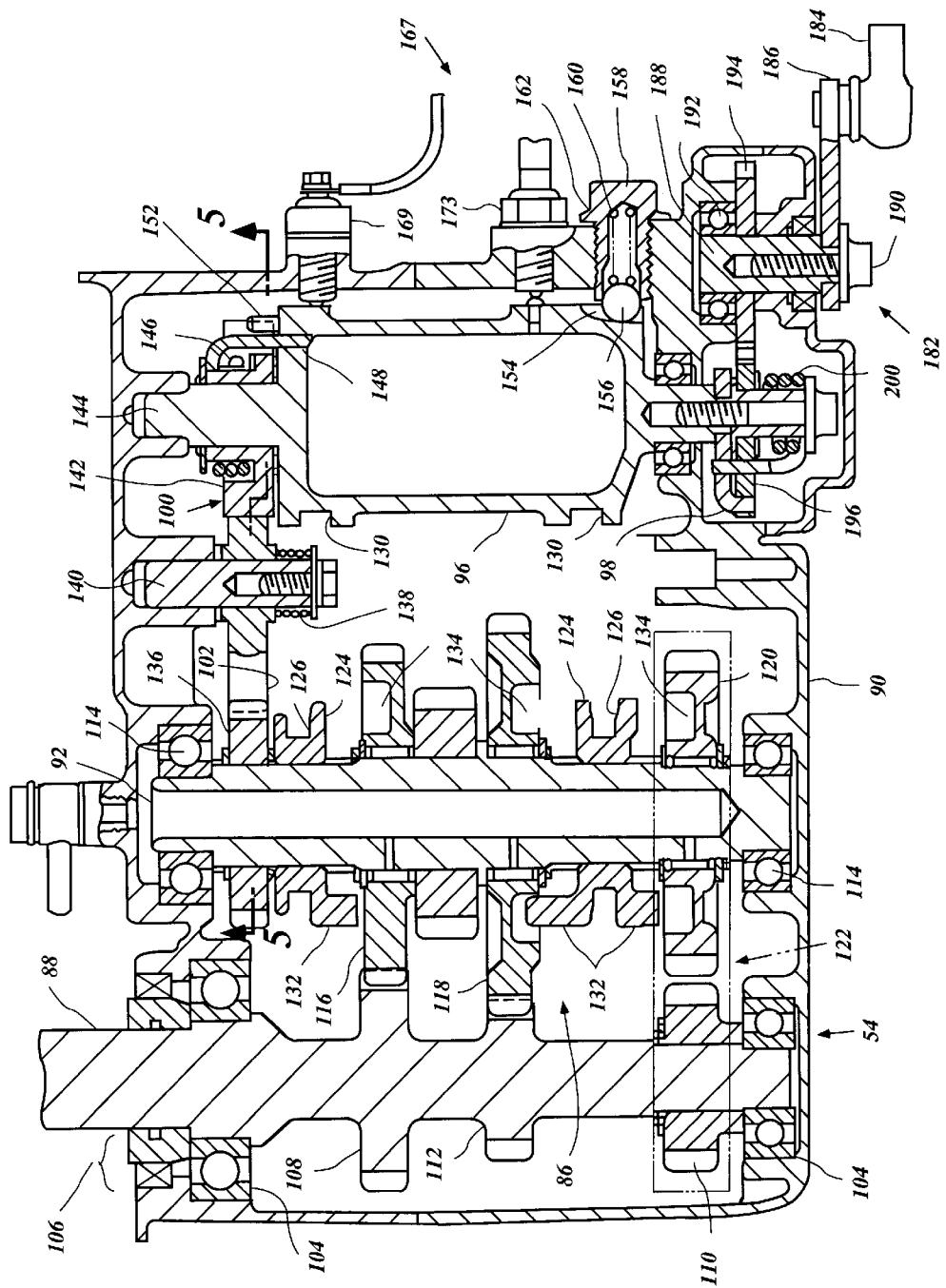
FIG. 4 is a cross-sectional view of the crankcase of FIG. 2 taken along the line 4—4.

With reference now to FIG. 4, the shiftable transmission 86 will be described in detail, including the operation of the parking brake unit 100 and the shiftable transmission components, including the shifting forks 98. With reference to FIG. 4, the input shaft 88 extends from the variable speed transmission 76 into the gear box 90 through an opening. A set of bearings 104 desirably journal the input shaft 88 for rotational movement in the gear box in a known manner. The opening through which the input shaft extends is also preferably provided with a seal and bushing arrangement 106 to seal the gear box. The input shaft 88 preferably carries a plurality of gears for use in a shiftable transmission. As illustrated in FIG. 4, a large diameter gear 108, intermediate diameter gear 110 and a small diameter gear 112 are preferably carried on the input shaft 88 in a known manner. For instance, the gears may be integrally formed with the input shaft 88 or they may be splined to the shaft 88 such that they are drivingly engaged with the input shaft 88.

With continued reference to FIG. 4, the main shaft 92 is also desirably constrained for rotational movement within the gear box 90. In the illustrated embodiment, a set of bearings 114 positioned on either end of the main shaft 94 journal the main shaft 92 for rotation. A plurality of gears are carried on the main shaft 92 in a similar fashion to those that are carried on the input shaft 88. Specifically, a first gear 116 is in engagement with the large gear 108 while a larger second gear 118 meshes with the smaller gear 112 of the input shaft 88. In the illustrated embodiment, the large gear 108 has a smaller diameter than the first gear 116 while the smaller gear 112 has a greatly smaller diameter than the second gear 118. Therefore, due to the gear ratios, the coupling of the large gear 108 and the first gear 116 result in a high speed gear arrangement while the coupling of the smaller gear 112 and the second gear 118 result in a low speed gearing arrangement.

With reference to gear 110 which is the intermediate gear carried on the input shaft 88, the gear 110 is coupled to a reverse gear 120 through the use of a chain drive 122. In this arrangement the main shaft 92 will be coupled to the input shaft 88 for rotation in a reverse direction as compared to its rotational direction when the driving engagement is created by the high and low gear arrangements. As will be recognized by those of skill in the art, the gears 116, 118 and 120 are desirably capable of rotation separate from the rotation of the main shaft 92. In this way, by selectively coupling the gears 116, 118, or 120 to the main shaft 92, the output may be varied. It should be noted that such a selective coupling of gears to a shaft may also be performed on the input shaft as well.

With continued reference to FIG. 4, two dog clutches 124 are positioned along the main shaft 92 and are preferably splined thereto such that the dog clutches 124 are rotated along with any rotation of the main shaft 92. As such, as will be recognized by those of skill in the art, the illustrated dog clutches 124 are preferably collars having internal splines that mate with and slide on external splines of the main shaft 92. As illustrated, the dog clutches each comprise a circumferential groove in which a shifting fork 98 may ride. In this manner, as the dog clutch 124 rotates, the shifting fork 98 rides within the groove 126 and allows the dog clutch 124 to rotate while the shifting fork 98 remains fixed relative to the gear box 90.

Figure 2:
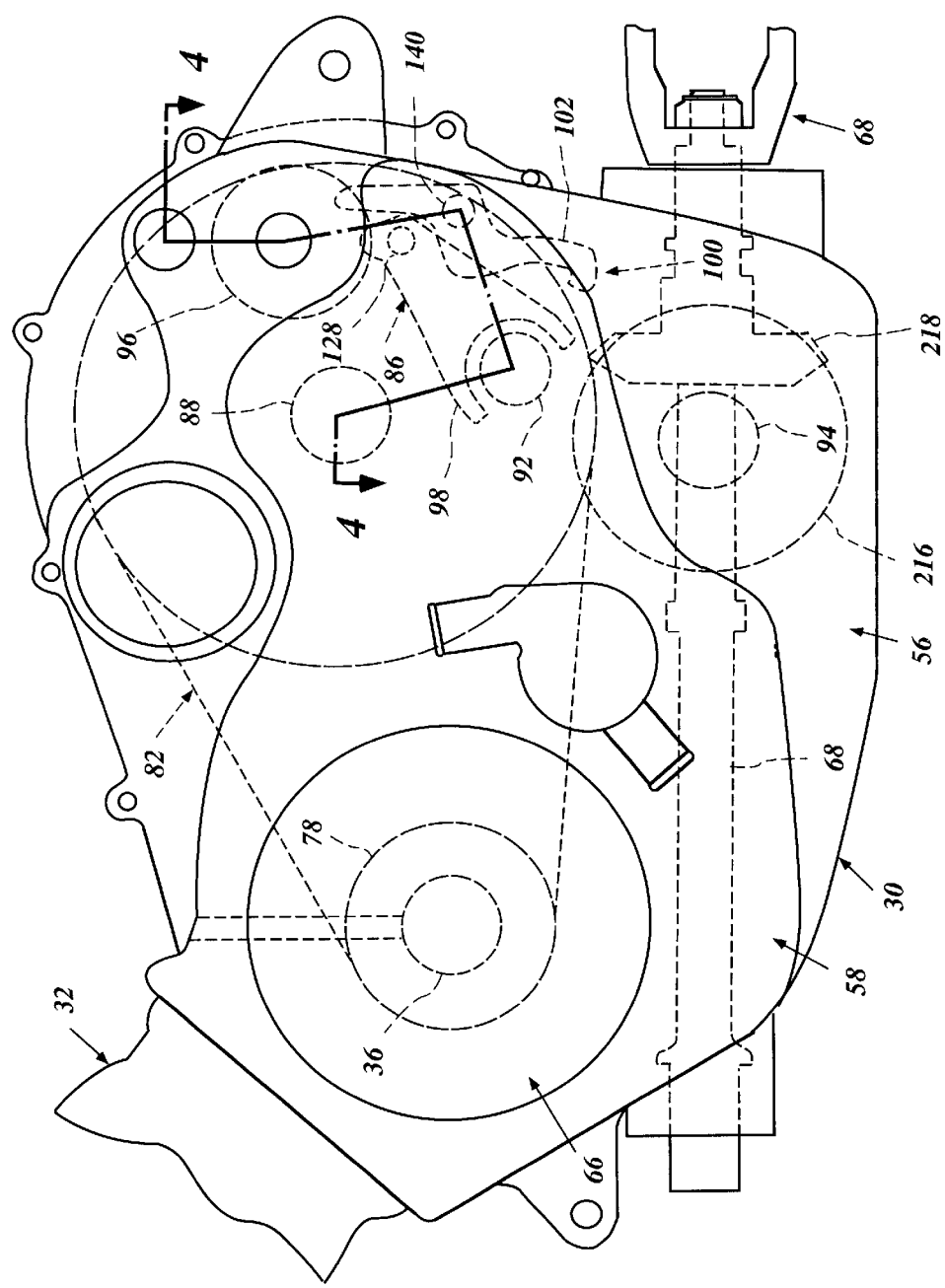
FIG. 2 is an enlarged side view of a crankcase for use in an all-terrain vehicle such as that illustrated in FIG. 1 having certain internal components illustrated with hidden lines.

With initial reference to FIG. 2, the shifting fork 98 is mounted for translation along a support shaft 128. The support shaft 128 allows the shifting fork 98 to be translated in a direction substantially parallel to the axis of the main shaft 92. Thus, the longitudinal position of the shifting fork 98 and the connected dog clutch 124 may be varied along the axis of the main shaft 92.

With continued reference to FIG. 2, one end of the shifting fork 98 is in engagement with the cam drum 96. With reference now to FIG. 4, the illustrated cam drum 96 comprises a pair of spiral grooves 130 in which a portion of the shifting forks 98 are positioned for travel. Thus, as the cam drum 96 rotates, the spiral grooves 130 are turned resulting in lateral movement of the shifting forks 98 in a known manner. Due to this cam and follower arrangement, the relative positions of the shifting forks 98, including the attached dog clutches 124, and the main shaft 92 may be altered.

As the axial position of the dog clutches along the main shaft 92 is varied, a gear engaging portion 132 of the dog clutch 124 is brought into engagement with the respective gears 116, 118, and 120 to couple the selected gear 116, 118, or 120 to the main shaft 92. As illustrated, each of the gears 116, 118, and 120 comprise an inner ring of engaging teeth or at least an engaging portion. These engaging portions are indicated generally by the reference numeral 134. Thus, by altering the relative positions of the dog clutch 124 along the main shaft 92 through the use of the cam drum 96 and shifting fork arrangement, an operator may select a relative gearing ratio to result in a high, low, reverse, or neutral arrangement.

The parking brake arrangement will now be discussed in detail. The main shaft 92 carries a parking brake gear 136 through which the transmission 86 and the wheels attached thereto, 16, 18, may be locked from rotation. With continued reference to FIG. 4, the parking gear 136 is splined to the main shaft 92 such that the parking gear 136 must rotate with the main shaft 92 under all conditions. While this is the case in the present illustrated embodiment, it is anticipated that other arrangements such as a dog clutch arrangement may also be used to selectively lock the parking gear 136 to the main shaft 92.

Figure 5A:
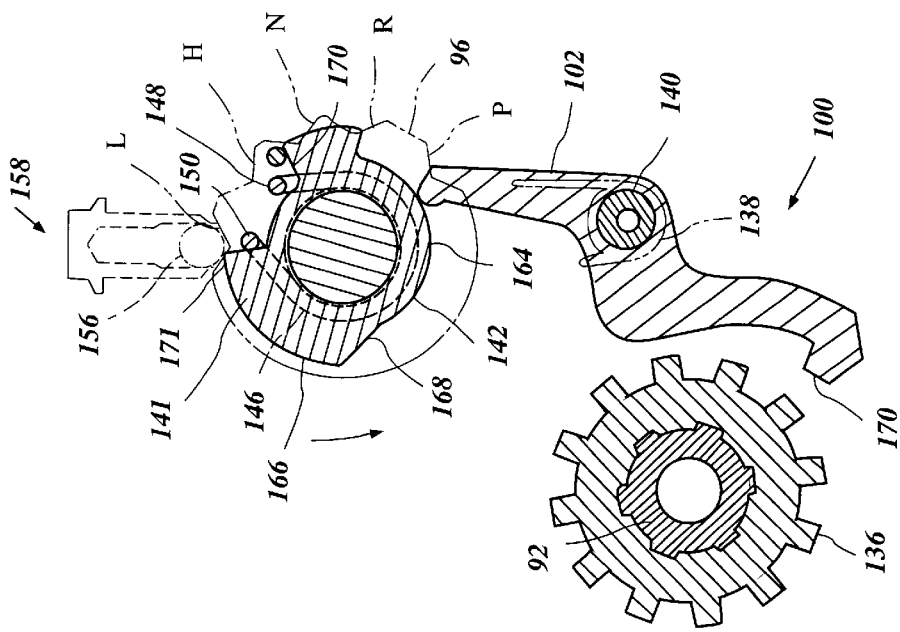
FIGS. 5A–5E are cross-sectional views of the transmission lock illustrated in FIG. 4 taken along the line 5—5 illustrating an embodiment of a transmission lock arrangement illustrated in various positions related to engagement of the transmission lock mechanism; and, FIG. 6 is an enlarged rear cross-sectional view illustrating another embodiment of a transmission lock arrangement.
Figure 5B:
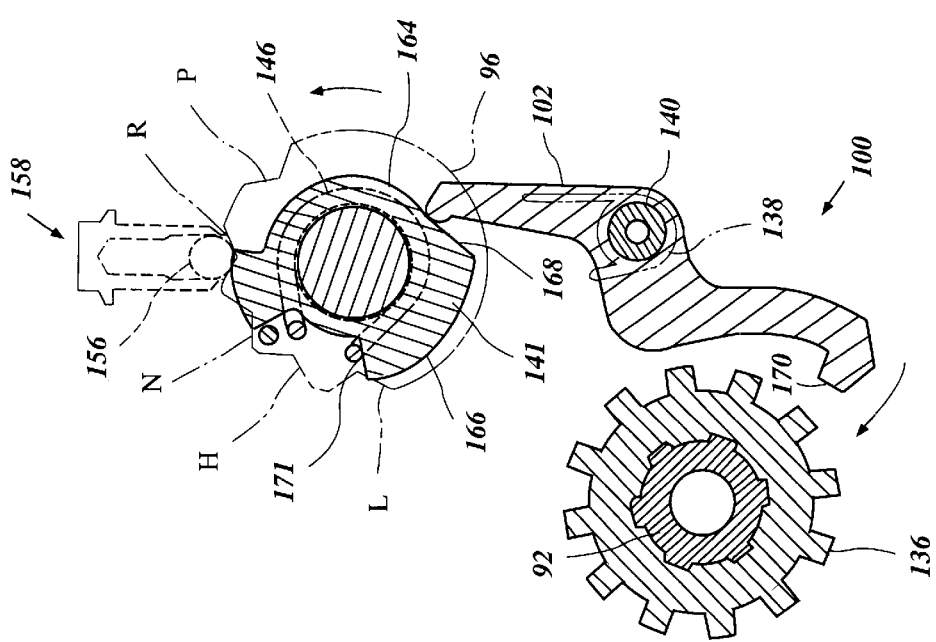

With continued reference to FIG. 4, the operational element 102 is pivotably secured to the gear box 90 using a torsion spring 138 and threaded fastener arrangement. Specifically, a peg 140 extends into an aperture of the gear box wall 90 and the threaded fastener couples the torsion spring 138 to the stud 140. The torsion spring 138 is preferably coupled to the operational element 102 or pawl, as illustrated in FIGS. 5a–5b such that the pawl is biased in one direction, generally away from the main shaft.

Notably, the operational element 102 generally comprises a see-saw lever-type of structure having a first end and a second end with a pivot axis interposed therebetween. Additionally, the torsion spring 138 urges the first end against a cam surface 142 that is attached to the cam drum 96 about a support shaft 144, as illustrated in FIG. 4. With continued reference to FIG. 4, the cam surface 142 is designed to rotate relative to the support shaft 144, however, the cam surface 142 is attached to the cam drum 96 with the use of a torsion spring 146 in the illustrated embodiment. The torsion spring 146, in turn, has a first end 148 that is interlocked with, or fixed relative to, the cam drum 96, as shown in FIG. 4. As shown in FIG. 5, a second end of the torsion spring 146, indicated generally by reference numeral 150, is capable of free movement relative to the cam drum 96. Additionally, a peg 152 extends away from the cam drum 96 into the region occupied by the cam surface 142. In this configuration, the peg 152 and the torsion spring 156 form a lost motion coupling of the cam surface 142 and the cam drum 96.

With continued reference to FIG. 4, the cam drum 96 also features a plurality of detents carried on the opposite end of the illustrated cam drum relative to the cam surface 142. The detents 154 cooperate with a ball that is contained within a spring and housing arrangement 158. The spring biases the ball against the cam drum 96. Notably the spring and housing arrangement comprises a compression spring 160 contained within the housing 162 with a portion of the housing 162 sized and configured such that the ball 152 may recede back into the housing 162 to allow the cam drum to rotate between locked positions.

With reference to FIGS. 5a through 5e, the detents 154 are indicated generally by letter, referring to the relative positions of the illustrated cam drum. For instance, P represents parking, R represents reverse, N represents neutral, H represents high gear, and L represents low gear. As will be understood by those of ordinary skill in the art, these positions are illustrative of a single set of many different sets of positions that may be used. Additionally, the illustrated detents 154 are formed in an obtuse triangular construction, however, various other shapes and configurations may also be used to allow the cam drum 96 to rotate and lock into selected positions.

With reference to FIGS. 5a–5e, the illustrated camming arrangement will now be described in detail. Initially, the cam surface 142 is generally comprised of a smaller diameter portion 164 and a larger diameter portion 166 with a sloping portion 168 extending therebetween. Generally opposite the smaller diameter portion 164 is a recessed side portion 170. Within the recessed side portion 170 the torsion spring 164 is fixed by its fixed end 148 while a side surface of the side portion 170 is designed to engage with the pin 152 to limit relative movement between the cam drum 96 and the cam surface 142. The illustrated cam surface 142 is a portion of a cam member 141. The free end 150 of the illustrated torsion spring 146 is in engagement with a side surface 171 to urge the cam 141 in a generally counter-clockwise direction, as illustrated in FIGS. 5A–5E. In this manner, if the cam 141 is urged clockwise relative to the cam drum 96, the tension buildup in the torsion spring 146 will return the cam 141 in a clockwise direction upon release.

With reference to FIG. 4, a cam drum position sensor 167 is also provided. The sensor 167 includes a transmitter 169 and a detector 173. The transmitter 169 of the illustrated embodiment emits an electrical voltage into the cam drum 96. When a contact on the cam drum 96 is aligned with the detector 173, a current is established. The detector 173 can then communicate with a light or other indicator (not shown) to convey an operational condition of the shiftable transmission. For instance, a parking brake indicator (either visual or auditory) may alert the driver that the transmission is in park. As will be appreciated by those of ordinary skill in the art, the sensor 167 may also indicate the position (i.e., low, high, reverse, neutral) of transmission.

With reference now to FIGS. 5A–5E, the engagement of the parking brake unit 100 will be described in detail. Specifically, the operational element 102 generally comprises a pawl arrangement 170 that is shaped, configured, and arranged to engage with the teeth of the parking gear 136 when desired. As such, when it is desired to lock the transmission and wheels from rotation, a pawl 170 is brought into engagement with the gear 136 such that the pawl falls within the spaces defined between the teeth of the gear 136. Such an operation will now be described in detail.

With reference initially to FIG. 5A, the shiftable transmission is illustrated in a position corresponding to the low gear. In such a configuration, the shifting forks (not shown) have engaged gears 112 and 118 with the main shaft 92. When shifting is desired, a shifting arrangement, to be described later, causes the cam drum 96 to rotate of the gear box 90. As this rotation occurs, the shifting forks are moved within the gear box 90 in an axial direction of the main shaft 92 through the use of the cam grooves or spiral grooves 130. As the rotation of the cam drum 96 continues, the detent mechanism 156, 154 continues to selectively lock the cam drum into relative positions such as reverse, as indicated in FIG. 5B.

Figures 5C, 5D, 5E:
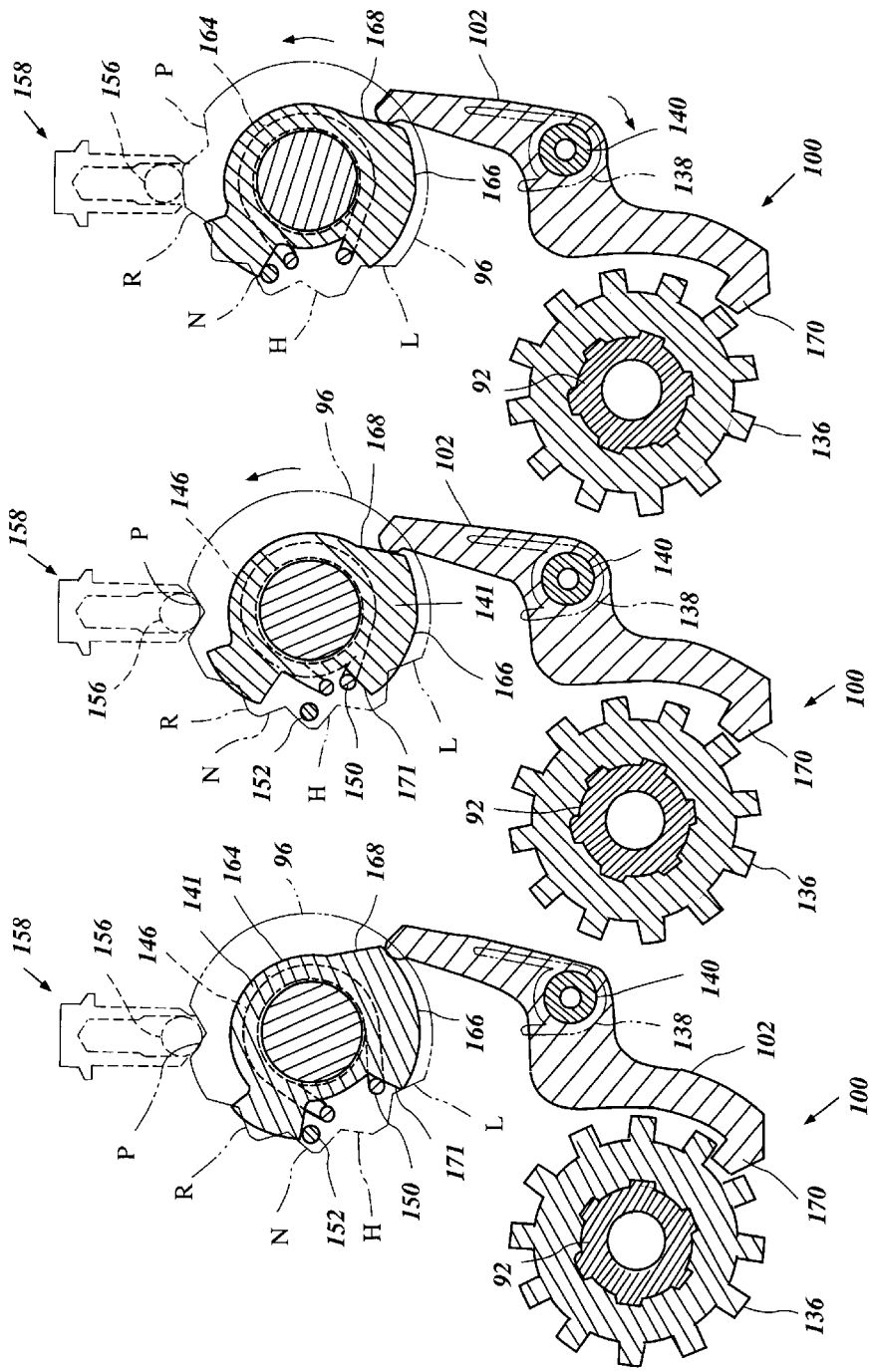

Upon the cam drum 96 reaching the reverse position, as indicated in FIG. 5B, the first end of the operational element 102 begins to slide up the sloping face 168 of the cam surface 142. As it slides up the sloping surface 168, the pawl end of the operational element 102 is urged toward the parking gear 136. With reference to FIG. 5C, the cam drum is illustrated in a position between reverse and park. As such, the first end of the illustrated operational element 102 has almost completed its travel along the sloping surface 168 to the large diameter surface 166. At this point, the pawl 170 is in contact with the surface at the outer diameter of the teeth of the gear 136.

With reference to FIG. 5D, once the cam drum has been moved to the park position, the ball and detent mechanism lock the cam drum into the park position. Meanwhile, the pawl 170 is still resting on the rotating teeth of the gear 136 as they slow to a halt because they are no longer in driving engagement with the input shaft 88. In this arrangement, the cam 141 is stopped from further counter-clockwise rotation and tension builds up in the torsion spring 146. Accordingly, the side face 170 is removed from the pin 152.

With reference now to FIG. 5E, the pawl 170 has now snapped into position between the teeth of the parking gear 136. As such, this relative motion at the pawl end of the operational element 102 results in a corresponding outward movement at the first end of the operational element that is in contact with the sloping face of the cam surface 142. This outward movement results, in part, due to the force of the torsion spring 138 that is urging the pawl end into engagement with the parking gear 136. Once this movement of the pawl into engagement with the parking gear 136 occurs, the lost motion mechanism of the cam 141 snaps the cam 141 in a counter-clockwise direction resulting in the first end of the operational element 102 coming to rest on the larger diameter portion 166 of the cam surface 142. In this manner, the pawl 170 is held in engagement with the parking gear 136 until the cam drum 96 is rotated into the reverse, neutral, high, or low position resulting in the first end of the operational element 102 sliding back down the slope 168, allowing the pawl 170 to be released from engagement with the parking brake 136. As described above, the parking brake 136 is desirably splined with the main shaft 92 such that if rotation of the parking gear 136 is stopped, rotation of the main shaft 92 is also stopped.

With continued reference to FIG. 4, the shifting mechanism mentioned above capable of moving the cam drum 96 between relative positions within the gear box 90 will now be described. As illustrated in FIG. 1, a shifting lever 180 is desirably positioned within reach of an operator positioned on the seat 22. While the illustrated shifting lever 180 is positioned proximate a forward end of the fuel tank 24, many other positions, such as on the steering handle assembly 28, or proximate the seat 22, are also contemplated. In addition, a push button arrangement may also be used. The shifting lever 180 is connected to a shifting assembly 182 through a transfer cable 184. The transfer cable 184 is desirably of the Bowden wire type; however, any other suitable transfer assembly may be utilized, such as a push rod or the like.

In the illustrated embodiment, the cable 184 is capable of transmitting only tensile forces. Accordingly, a spring biased shifting mechanism is desirable. Such a mechanism 182 will now be described with reference to FIG. 4. The cable 184 is tied to a shifting lever 186 through any suitable fastening arrangement. The illustrated shifting lever is secured to a pivot rod 188 through a threaded fastener 190. In the illustrated embodiment, a bearing 192 desirably journals the rod 188 for rotation relative to a boss formed within a side wall of the gear box 90. The shifting rod 188 is coupled to a first transfer gear 194 to transfer the rotational motion caused by the lever 186 acting on the rod 188.

With continued reference to FIG. 4, the first transfer gear 194 is engaged with a second gear 196 such that the rotational motion of the first gear 194 can be transferred directly to the second gear 196. A lever 198 is keyed to the cam drum 96 such that movement of the lever will result in corresponding rotational movement of the cam drum 96. The illustrated lever 198 is desirably engaged within a slot of the gear 196 such that one face of the slot will move the lever 198 and oppose the force of a torsion spring 200 designed to act against a motion of the gear 196. In this manner, the lever 186, which is attached to the cable 184, will be returned to a position such that only tensile forces are required of the cable 184. It should be recognized that a push/pull cable or tie rod arrangement may also be utilized to obviate the need for such a return of motion mechanism.

Thus, by pulling the lever 180 rearward towards the driver, the cable 184 transfers the motion to the lever 186. The motion transmitted by the cable 184 results in a forward movement of the lever 186. The forward movement of the lever 186 results in a counter-clockwise rotation of the gear 194. As the gear 194 rotates in a counter-clockwise direction, the second gear 196 is rotated in a clockwise direction. This clockwise rotation acts opposite to the biasing force of the torsion spring 200. The clockwise motion is thereby transmitted to the shifting drum 96 to result in movements as described above. Note, however, that the clockwise rotation described just above corresponds to the counter-clockwise rotation described above with respect to FIGS. 5A–5E, as the figures are taken from at opposite ends of the cam drum 96.

Figure 6:
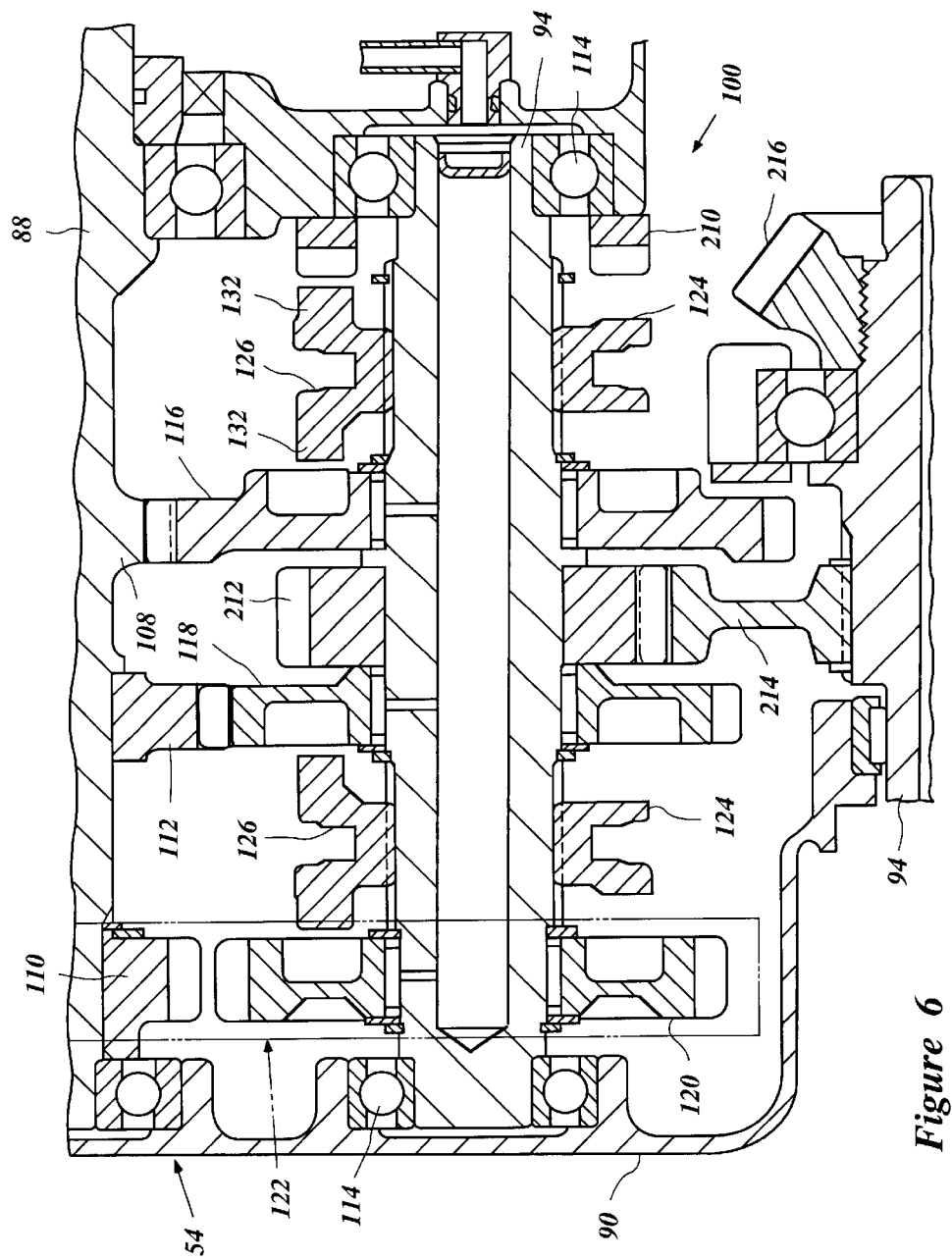

With-reference now to FIG. 6, an alternative arrangement of a transmission locking mechanism will be described. As the illustrated embodiment of FIG. 6 is similar to the embodiment described above with reference to FIGS. 1 through 5E, like elements will be referred to with like reference numbers and the distinctions therebetween will be described. Now with reference to FIG. 6, the input shaft 88 carries the large gear 108, the intermediate gear 110, and the smaller gear 112. These gears are arranged for engagement either through a chain drive, as in the reverse gear arrangement shown in the box 122, or direct meshing with the gears 118 and 116. Moreover, a dog clutching arrangement using dog clutches 124 similar to those described above, is utilized.

In this arrangement, however, the parking gear 136 has been omitted and, instead, a fixed engaging structure 210 has been provided. The fixed engaging structure 210 is desirably fixed to a portion of a wall of the gear box 90 such that rotation cannot occur between the member 210 and the wall 90. In this manner, the clutching arrangement described above with respect to the gears may also be used to bring the engaging element 132 of the dog clutch 124 closest to the member 210 into engagement with the member 210. When these two members are in engagement, the transmission will be locked from rotation. Accordingly, the wheels would also be locked for rotation that are coupled to the transmission. This arrangement eliminates the need for a pawl lock as described above as the dog clutch and member engagement, in part, forms a locking transmission arrangement.

With reference to FIG. 6, the dedicated drive gear 212 is engaged with a dedicated drive gear on the output shaft 94. The dedicated gear on the output shaft 94 is indicated generally by the reference number 214. As illustrated, the motion of the output shaft 94 is transmitted to the balance of the transmission through the bevel gear arrangement, including the input bevel gear 216. With reference to FIG. 2, the input bevel gear 216 is meshed with an output bevel gear 218 that drives the drive line 68 through known coupling devices.

In view of the foregoing, it is anticipated that the transmission locking mechanism of the present invention will allow the crankshaft to be coupled to the wheels through a variable speed, V-belt-type transmission and centrifugal clutch while still allowing the transmission to be locked to keep the wheels from rotating when desired. Moreover, the shifting arrangement disclosed herein allows for a larger range of speeds to be accomplished with a shiftable transmission in series with the variable speed transmission. Thus, the benefits of the variable speed transmission, including the smooth transition over a wide range of engine speeds may be accomplished while still obtaining the benefits of a shiftable shaft, two-speed gearing arrangement, including, among other things, a reverse, a neutral, and a parking gear position. Moreover, as the above-described variable speed transmission includes a centrifugal clutch, which selectively disengages the drive lines from the crankshaft according to crankshaft output speed, the illustrated transmission lock advantageously allows the wheels to be locked even while the centrifugal clutch is disengaged. Accordingly, the benefits of both the centrifugal clutch and the lockable transmission may be accommodated through the above-described invention.

Although the present invention has been described in terms of certain preferred embodiments, other embodiments apparent to those of ordinary skill in the art also are within the scope of this invention. Thus, various changes, modifications, and alterations may be made in the above-described embodiments without departing from the spirit and scope of the invention. Moreover, not all the features, aspects, and advantages are necessarily required to practice the present invention. Therefore, some of the features, aspects, and advantages may be separately practiced from other features, aspects, and advantages while still practicing a part or all of the above-described invention. Accordingly, the scope of the present invention is intended to be defined only by the claims that follow.

What is claimed is:

1. An all terrain vehicle comprising a frame, at least one front wheel and at least one rear wheel connected to the frame, an engine mounted to the frame, the engine powering a crankshaft, a centrifugal clutch connecting the crankshaft to a variable speed transmission, a shiftable transmission connected to the variable speed transmission, the shiftable transmission connected to at least one drive line extending to at least one of the front wheel or the rear wheel, the shiftable transmission comprising a locking portion capable of locking the transmission from rotation when the locking portion is engaged, the locking portion comprising a parking gear that is joined to a main shaft, the main shaft being engaged with the drive line through a gear train, and a pawl being arranged to engage the parking gear such that the main shaft may not rotate when the pawl is engaged with the parking gear and such that main shaft may when the pawl is not engaged with the parking gear, the pawl having a first end and a second end, the first end being in contact with a cam surface and the second end being selectively engageable with the parking gear, a pivot point being interposed between the first end and the second end, and a biasing member urging the first end into substantially constant contact with the cam surface, the cam surface having a small diameter portion and a large diameter portion, the first end of the pawl being adapted to slide along the cam surface that as the first end is in contact with the small diameter portion, the second end of the pawl not being capable of engagement with the parking gear such that as the first end is in contact with the large diameter portion, the second end of the pawl is capable of engagement with the parking gear, the cam surface forming a portion of a cam member, and a lost motion mechanism coupling the cam member and a cam drum together for rotation.

2. The all terrain vehicle of claim 8, wherein the crankshaft extends transverse to a longitudinal axis of the vehicle.

3. The all terrain vehicle of claim 8, wherein the main shaft carries at least two gears that are selectively engageable with the main shaft such that rotation of at least one of the gears is transferred to the main shaft when the gear is engaged with the main shaft.

4. The all terrain vehicle of claim 8, wherein the main shaft carries at least two gears that are joined to the main shaft such that rotation of the gears is transferred to the main shaft.

5. An all terrain vehicle comprising a frame, at least one front wheel and at least one rear wheel connected to the frame, an engine mounted to the frame, the engine powering a crankshaft, a centrifugal clutch connecting the crankshaft to a variable speed transmission, a shiftable transmission connected to the variable speed transmission, the shiftable transmission connected to at least one drive line extending to at least one of the front wheel or the rear wheel, the shiftable transmission comprising a locking portion capable of locking the transmission from rotation when the locking portion is engaged, the locking portion comprising a clutching member and a stationary structure, the clutching member being engageable with the stationary structure and the transmission to prevent rotational movement of the transmission, the stationary member forming at least a portion of a wall of a gear box containing at least a portion of the transmission, the clutching member comprising a collar splined to a shaft of the transmission, the collar being slidable along an axis of the shaft, the collar including engaging members that extend in an axial direction such that the engaging members may be brought into registry with the stationary member, a shifting fork arrangement being adapted to translate the collar along the axis of the shaft; and the shifting fork arrangement comprising a drum member and a shifting fork, the drum member having a helical groove and the shifting fork having a portion that rides in the groove such that the shifting fork translates in response to rotation of the drum member.

6. An all terrain vehicle comprising a frame, a seat attached to the frame, at least one front wheel being connected to a forward portion of the frame, at least one rear wheel being connected to a rear portion of the frame, an engine being mounted to the frame generally between the front wheel and the rear wheel, a transmission being connected to at least one of the front wheel and rear wheel, a clutch being interposed between the engine and at least a portion of the transmission, the transmission comprising a variable speed transmission and a shiftable geared transmission contained at least partially within a housing, a parking brake arranged within the housing, and a substantially vertical longitudinal plane dividing the vehicle in two substantially equal portions, wherein the variable speed transmission is positioned on one side of the plane and the parking brake is positioned on the other side of the plane.

7. The all terrain vehicle of claim 6, wherein the transmission is connected to at least one of the front wheel and rear wheel through a drive shaft, the drive shaft being positioned on the variable speed transmission side of the plane.

8. The all terrain vehicle of claim 6, wherein the parking brake engages a portion of the shiftable geared transmission to prevent substantial wheel motion when engaged.

9. The all terrain vehicle of claim 8, wherein the transmission is not capable of transmitting power to the wheels when the parking brake is engaged.

10. The all terrain vehicle of claim 6, further comprising a sensing arrangement, the sensing arrangement communicating with an alert device to inform an operator that the parking brake is engaged.

11. The all terrain vehicle of claim 6, wherein the clutch comprises a centrifugal clutch.

12. An all terrain vehicle comprising a frame, at least one front wheel connected to the frame, an engine mounted to the frame, the engine powering a crankshaft, a centrifugal clutch connecting the crankshaft to a variable speed transmission, a shiftable transmission connect to the variable speed transmission, the shiftable transmission connected to the variable speed transmission, the shiftable transmission connected to at least one drive line extending to at least one of the front wheel or the rear wheel, the shiftable transmission comprising a locking portion capable of locking the transmission from rotation when the locking portion is engaged, and further comprising a shifting drum and a shifting fork, said shifting fork cooperating with said shiftable transmission to change between gears of said shiftable transmission, said shifting drum also adapted to actuate said locking portion.

13. The all terrain vehicle of claim 12, wherein said shifting drum comprises a cam member and said cam member is coupled to said shifting drum for rotation, said cam member actuating said locking portion.

14. The all terrain vehicle of claim 13, wherein said locking portion comprises a follower portion and a pivot point, said locking portion rotating about said pivot point when said follower portion is moved by said cam member.

15. A vehicle comprising a frame, a seat mounted to said frame, at least one drive wheel and an engine carried by said frame, a transmission connected to said engine by a clutch, said transmission comprising a continuously variable portion and a change speed portion, said transmission comprising a shifting drum portion, a first gear and a second gear, said shifting drum portion selectively engaging said first gear or said second gear, said transmission also comprising a locking portion, said shifting drum portion also selectively engaging said locking portion, said shifting drum connected to a level disposed proximate said seat whereby movement of said lever is transferred to said shifting drum to shift gears and to operate said locking portion.

16. The vehicle of claim 15, wherein said lever is connected to said shifting drum with a cable.

17. The vehicle of claim 15, wherein said locking portion comprises a member slideably mounted on a shaft and a stationary member formed on a wall of a gear box containing at least a portion of said transmission.

18. The vehicle of claim 15, wherein said locking portion comprises a gear fixed to a shaft of said shiftable transmission and a pawl member connected to said shifting drum.

19. The vehicle of claim 15, wherein said clutch is a centrifugal clutch.

20. An all terrain vehicle comprising a frame, at least one front wheel and at least one rear wheel connected to the frame, an engine mounted to the frame, the engine powering a crankshaft, a centrifugal clutch connecting the crankshaft to a variable speed transmission, a shiftable transmission connected to the variable speed transmission, the shiftable transmission connected to at least one drive line extending to at least one of the front wheel or the rear wheel, the shiftable transmission comprising a locking portion capable of locking the transmission from rotation when the locking portion is engaged, the locking portion comprising a parking gear that is joined to a main shaft, the main shaft being engaged with a drive line that connects to at least one of the front wheel and the rear wheel, the main shaft and the drive line being engaged through a gear train, and a pawl arranged to engage the parking gear such that the main shaft may not rotate when the pawl is engaged with the parking gear and such that the main shaft may rotate when the pawl is not engaged with the parking gear, the pawl having a first end and a second end, the first end being in contact with a cam surface and the second end being selectively engageable with the parking gear, a pivot point interposed between the first end and the second end, and a biasing member urging the first end into substantially constant contact with the cam surface, the cam surface having a small diameter portion and a large diameter portion, the firs end of the pawl sliding along the cam surface such that as the first end is in contact with the small diameter portion, the second end of the pawl is not capable of engagement with the parking gear and such that as the first end is in contact with the large diameter portion, the second end of the pawl is capable of engagement with the parking gear, the cam surface forming a portion of a cam member and a lost motion mechanism coupling the cam member and a cam drum together for rotation.

21. The all terrain vehicle of claim 20, wherein the main shaft carries at least two gears that are selectively engageable with the main shaft such that rotation of at least one of the gears is transferred to the main shaft when the gear is engaged with the main shaft.

22. The all terrain vehicle of claim 20, wherein the main shaft carries at least two gears that are joined to the main shaft such that rotation of the gears is transferred to the main shaft.

23. An all terrain vehicle comprising a frame, at least one front wheel and at least one rear wheel connected to the frame, an engine mounted to the frame, the engine powering a crankshaft, a centrifugal clutch connecting the crankshaft to a variable speed transmission, a shiftable transmission connected to the variable speed transmission, the shiftable transmission connected to at least one drive line extending to at least one of the front wheel or the rear wheel, the shiftable transmission comprising a locking portion capable of locking the transmission from rotation when the locking portion is engaged, the locking element comprising a clutching member and a stationary structure, the clutching member being engageable with the stationary structure and the transmission to prevent substantial rotation movement of th transmission, the stationary member forming at least a portion of a wall of a gear box containing at least a portion of the transmission, the clutching member comprising a collar splined to a shaft of the transmission, the collar being slidable along an axis of the shaft, the collar including engaging members that extend in an axial direction such that the engaging members may be brought into registry with the stationary member, a shifting fork arrangement being adapted to translate the collar along the axis of the shaft, the shifting fork arrangement comprising a drum member and a shifting fork, the drum member having a helical groove, and the shifting fork having a portion that rides in the groove such that the shifting fork translates in response to rotation of the drum member.

\* \* \* \* \*